Feb. 27, 1951     C. B. MUELLER, JR     2,543,372
POULTRY PICKER
Filed Dec. 29, 1945     2 Sheets-Sheet 1
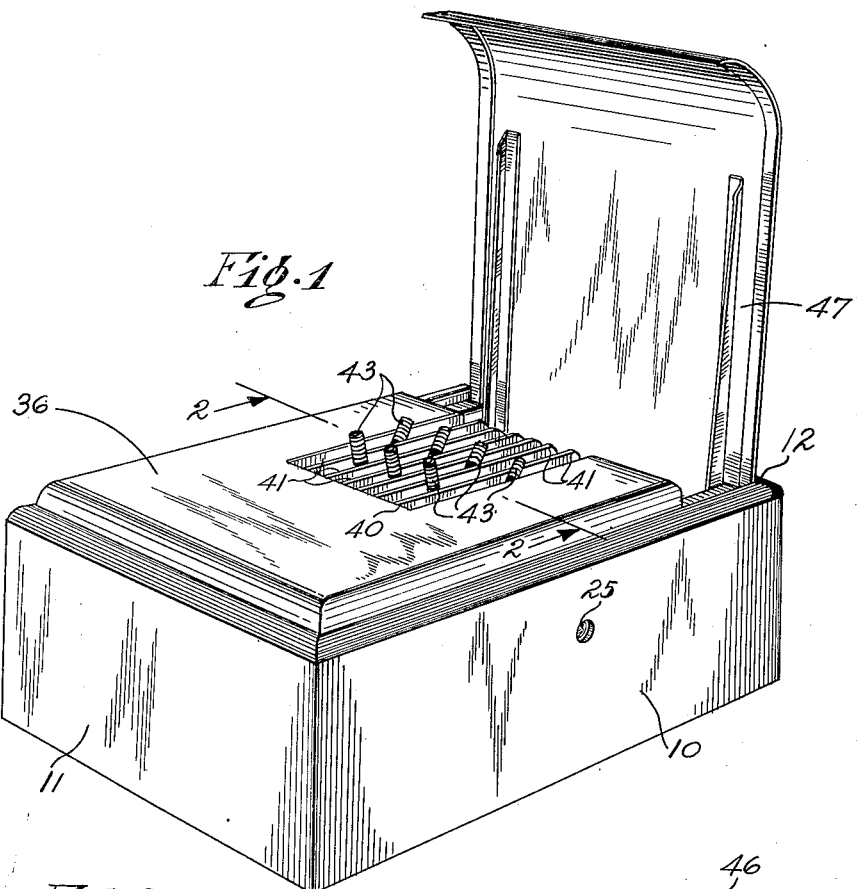
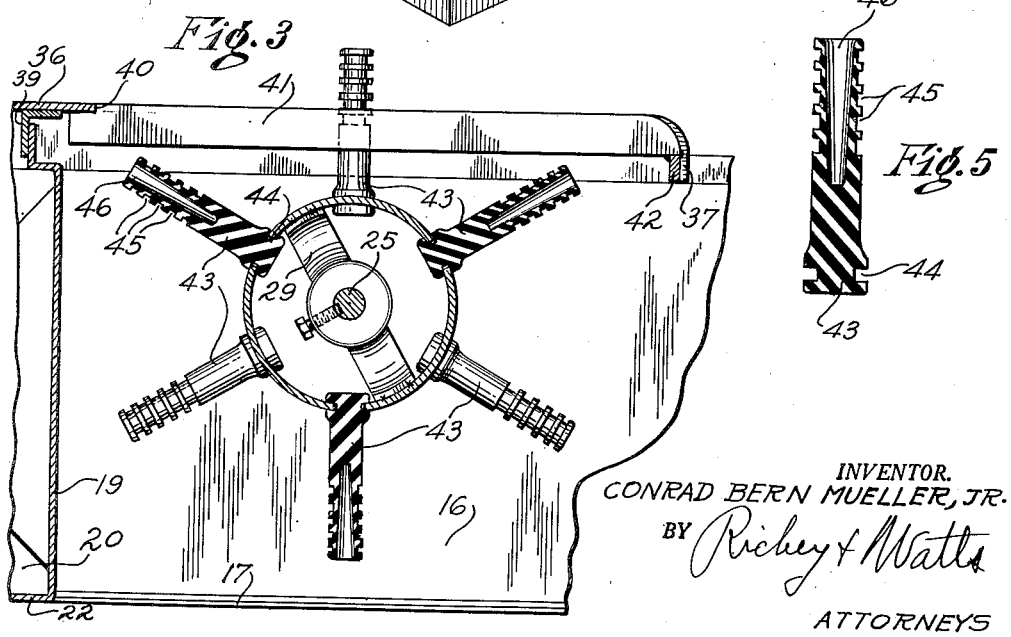
INVENTOR.
CONRAD BERN MUELLER, JR.
BY Richey & Watts
ATTORNEYS Feb. 27, 1951     C. B. MUELLER, JR     2,543,372
POULTRY PICKER
Filed Dec. 29, 1945                    2 Sheets-Sheet 2

INVENTOR.
CONRAD BERN MUELLER, JR.
BY Richey & Watts
ATTORNEYS

Patented Feb. 27, 1951

2,543,372

UNITED STATES PATENT OFFICE 2,543,372

POULTRY PICKER

Conrad Bern Mueller, Jr., Lakewood, Ohio

Application December 29, 1945, Serial No. 637,915

3 Claims. (Cl. 17—11.1)

This invention relates to machines for removing the feathers from poultry.

One object of this invention is to remove feathers from poultry rapidly and effectively without injury to the tissue, and to automatically regulate the forces applied to the poultry so as to increase the uniformity of the results and decrease the skill required in operation.

Another object is to limit to any desired or pre-selected amount the load that can be imposed on a poultry picking machine in use, so as to reduce the cost of a machine, of any given size, and produce more uniform results.

Another object is to increase the striking force and reduce the rubbing force of the flexible fingers of poultry picking machinery, while maintaining a simultaneous striking and rubbing action, so as to increase the feather removing effect of the fingers. Another object is to increase the effectiveness and speed of the removal of feathers from poultry without injury to the tissue so as to reduce or eliminate the scalding or other preparatory treatment of the poultry, and to obtain increased production.

Other objects are to simplify and reduce the size and cost of poultry picking machines without impairing their efficiency, and to produce a poultry picking machine suitable for small producers and individual users.

Other objects will appear hereinafter.

In the accompanying drawings which illustrate a preferred embodiment of this invention;

Fig. 1 is a perspective view of a poultry picking machine embodying this invention;

Fig. 3 is a fragmentary section taken on the plane indicated by the line 3—3 of Fig. 2;

Fig. 5 is a longitudinal section through one of the fingers.

Figure 2:
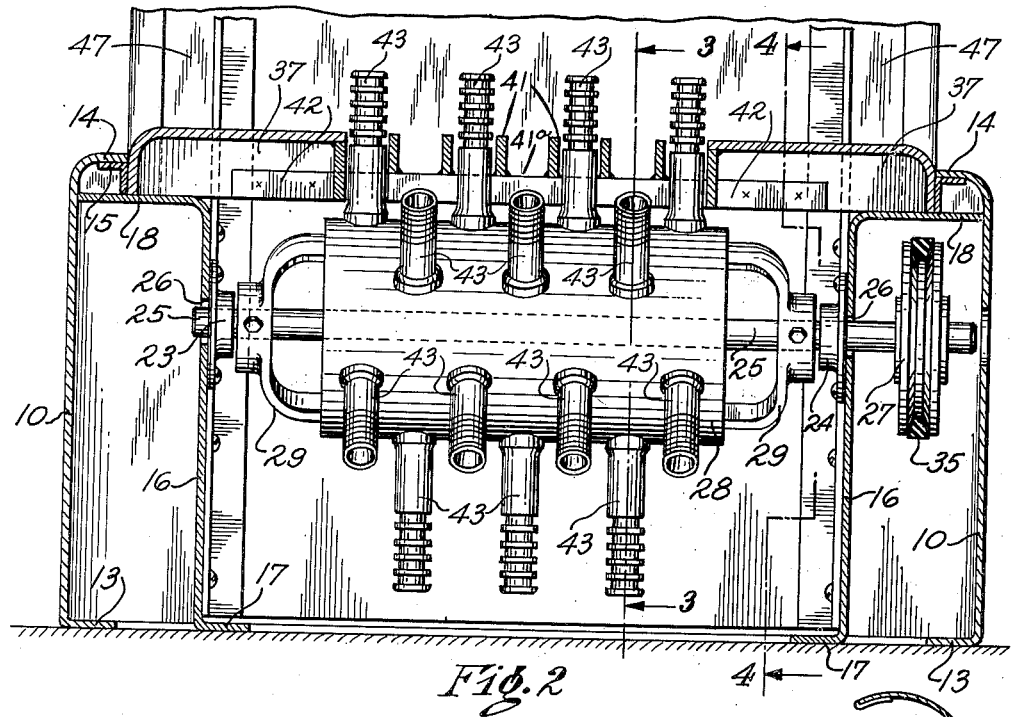
Fig. 2 is a cross section taken substantially on the plane indicated by the line 2—2 of Fig. 1, but showing the drum and fingers in elevation.

Referring to the drawings, the machine illustrated is mounted in a box-like frame comprising parallel side walls 10, a front wall 11 and a rear wall 12. Each of the walls 10, 11 and 12 is formed with an inturned flange 13 at its lower edge which serve to stiffen the walls and maintain the shape of the frame. Each of the walls 10, 11 and 12 is similarly provided with an inturned flange 14 at its upper edge, the flanges 14 being welded or otherwise secured to a rectangular frame 15 of angle iron which defines the top opening of the outer frame.

Figure 4:
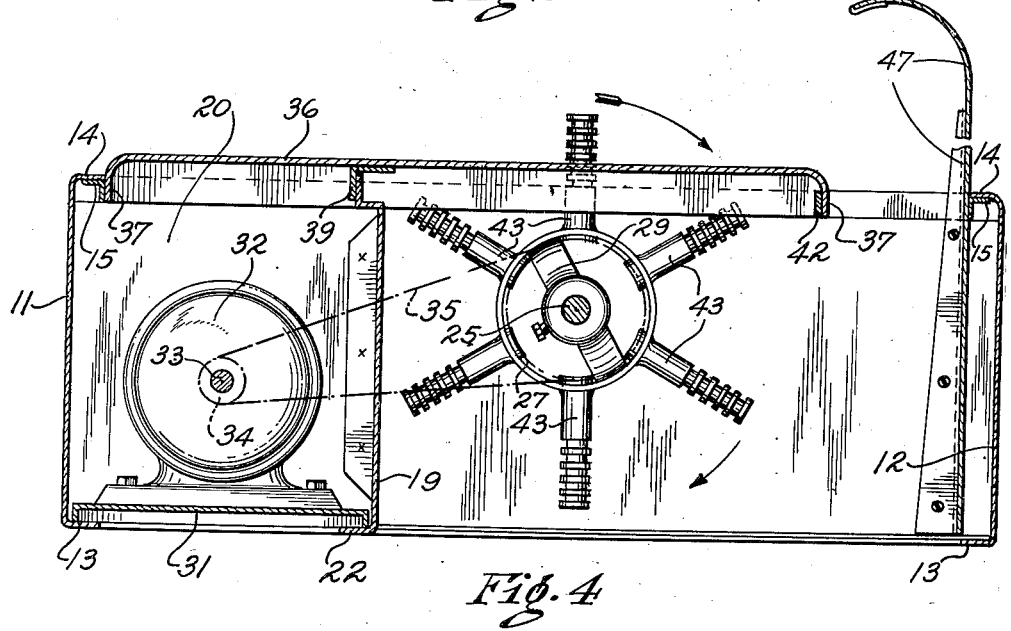
Fig. 4 is a cross section taken on the line 4—4 of Fig. 2.

Inner side walls 16 are secured at their opposite ends to the front and rear walls 11 and 12 and extend parallel with and spaced inwardly from the outer side walls 10. The inner side walls 16 are provided at their lower edges with inturned flanges 17 and at their upper edges with outwardly turned flanges 18 which extend out to and abut against the outer side walls 10. A transverse wall 19 (Figs. 3 and 4) extends between and is secured at its opposite ends to the inner side walls 16, dividing the space between the inner side walls into a motor compartment 20 and a drum compartment 21. The lower edge of the wall 19 is formed with a flange 22.

Within the drum compartment 21 aligned bearings 23 and 24 are secured to the inner side walls 16. A drum shaft 25 is journalled in the bearings 23 and 24. At one end the shaft extends through an aperture 26 in the inner side wall 16 into the space between the adjacent side walls 10 and 16, and supports a pulley 27.

A drum consisting of a sheet metal cylinder 28 secured at its opposite ends to spiders 29 is fixed to the shaft 25 for rotation therewith.

In the motor compartment 20 a supporting base 31 is secured to the flange 13 of the front wall 11 and the flange 22 of the transverse wall 19 and firmly supports a motor 32 of any suitable type. The shaft 33 of the motor projects through one of the inner side walls 16 into the compartment between the adjacent walls 10 and 16 in which the drum pulley 27 is located. A driving pulley 34 is secured to the motor shaft and a belt 35 connects the pulley 34 with the drum pulley 27, so that when the motor is operated the drum 28 is rotated. At the same time the walls 16 and 19 isolate the motor, the pulleys and the drive belt 35 from the drum compartment 21.

In the illustrated embodiment the machine is provided with a removable cover or wall member 36 formed at its edges with down turned flanges 37 which fit within the flanges 14 of the frame 15 across the front wall 11 and through the major portion of the length of the side walls 10. The cover 36 is also provided with a transverse angle iron piece 39 which engages with the upper edge of the transverse wall 19. Thus the cover fits down upon and is supported by the upper edge of the wall 19 and the out turned flanges 18 of the inner side walls 16.

The cover is cut away in the region of the drum 28 as indicated at 40. A plurality of spaced parallel bars or elongated members 41 are welded or otherwise suitably secured to the underside of the cover or wall 36 in advance of the opening 40 and extend rearwardly across the opening and are secured at their rear ends to a cross piece 42 welded or otherwise suitably secured to the flange 37 of the cover on opposite sides of the opening 40.

The drum 28 is provided with a plurality of flexible picking fingers 43 projecting from the periphery thereof and arranged to pass through the spaces or passages 41a between the adjacent bars 41 as indicated in Fig. 2. In the machine shown in the drawings there are six bars 41, providing seven parallel spaces through which the fingers 43 pass. The drum illustrated is provided with three fingers equally spaced about the periphery of the drum arranged to pass through each of the spaces between the bars 41. Adjacent sets of fingers are staggered so that in end elevation the drum is provided with six equally spaced rows of fingers. It will be understood, of course, that the particular number and arrangement of the bars 41 and fingers 43 may be varied as desired.

The fingers 43 are preferably constructed as illustrated in Fig. 5, each finger comprising a base portion formed with a circumferential groove 44 adapted to snap into an opening in the drum 28 and with a plurality of external corrugations 45 adjacent the free end. Preferably each finger has its flexibility increased and its weight decreased progressively toward the free end. As illustrated, this is accomplished by a tapering bore 46 extending into the free end of the finger, but it will be understood that the reduction in weight and increase of flexibility toward the free end of the finger may be obtained in any other way.

While the type of finger illustrated, which corresponds to the preferred type of finger disclosed and claimed in the patent to Hunt No. 2,300,157, has been found to be highly efficient in use, it will be understood that any other form and shape of yieldable striking member may be employed, particularly in combination with the bars 41 or the like which automatically limit the extent to which the poultry can be pressed into engagement with the fingers. In the preferred form the fingers 43 have sufficient stiffness to retain their original shape and position when the machine is idle, and to avoid collapse in an axial direction in use.

In the construction illustrated a feather guard 47 is secured to the inner side walls 16 adjacent the rear wall 12 and projects above the cover 36 a sufficient distance to catch the feathers thrown rearwardly by the fingers 43. The guard 47 is spaced rearwardly from the edge of the cover 36 and the bottom of the drum compartment is open so that the feathers can drop out of the machine.

In the machinery heretofore made embodying the invention of the Hunt Patent No. 2,300,157, it has been necessary to scald or semi-scald the poultry before removing the feathers with the machines in order to remove enough of the feathers without injuring the skin and attain sufficient speed to make the operation commercially practical. In accordance with one feature of the present invention the relation between the rubbing and striking forces of the fingers is such that the effectiveness of the picking action is increased, so that poultry can be picked with less effective scalding or other preliminary treatment, rapidly and effectively and without injuring the skin or tissue of the poultry. Conversely, with the same or equivalent preliminary treatment the picking action is more effective for a given size machine permitting a substantial reduction in size and cost of the machine.

In one embodiment of this invention this is accomplished by reducing the radius of rotation of the fingers, while maintaining the length of the flexible portion of the fingers which is bent over and rubs against the poultry, and maintaining the linear velocity of the fingers. Reducing the radius of rotation while maintaining a given linear velocity requires increasing the rate of rotation of the drum. The result is an increase of the centrifugal force at the outer ends of the fingers, giving a greater striking force, and a more rapid reduction in centrifugal force as the finger is bent over by contact with the poultry, so that the increased centrifugal force at the outer ends of the fingers is not applied to press the fingers more strongly against the poultry during the rubbing action. In the preferred embodiment, as illustrated, this new relationship of striking and rubbing forces is obtained by making the drum about six inches in diameter, projecting the fingers about 3½ inches from the drum and rotating the drum at about 500 to 600 revolutions per minute.

With this arrangement the linear velocity of the ends of the fingers is substantially the same as in the prior machines made according to the aforesaid Patent No. 2,300,157 which embody a much larger drum and a lower rate of rotation. At the same time the centrifugal force of the outer end of the finger is increased, giving a greater striking force, while the centrifugal force of the finger in its bent over position in rubbing against the poultry is not materially different than in such machines with larger drums so that the rubbing force remains about the same.

One difficulty which arises from increasing the striking force with respect to the rubbing force in this manner is that the arc described by the ends of the fingers is of relatively short radius with respect to the size of the poultry to be picked, so that there is a tendency for the fingers to wrap the poultry around the drum and drag it into the machine. This difficulty is avoided while the advantages of the small diameter drum are attained in the present invention by preventing the poultry from wrapping around the drum. In the preferred embodiment, as illustrated, this is accomplished by the spaced parallel bars 41 which prevent the poultry or any parts thereof from being wrapped around the drum or being dragged into the machine.

In operation, with the drum rotating at the desired speed, the operator places the poultry on the cover of the machine and presses it lightly against the portions of the fingers 43 which project above the spaced bars 41. The revolving fingers strike the poultry, bend or arch, and rub the feathered portion with one or more of the projections formed by the corrugations 45.

The fingers remove the feathers practically instantly from the portion of the poultry which they engage without injuring the skin or tissue. The operator may simply turn the fowl or bird so as to present all of the feathered portions to the fingers, and the feathers are completely removed in but a few seconds.

It is found that the feathers are removed simultaneously from the entire area of a bird presented to the action of the fingers, including the portions of that area directly above the guard bars 41 which are not actually contacted by any fingers. The striking and rubbing action removes the feathers as a mass simultaneously from the entire area.

The proper initial positioning or adjusting of the bars 41 with respect to the drum and fingers 43 permits the poultry being picked to be pressed down by the operator against the bars so that all portions are engaged by the fingers with the optimum force, greatly increasing the uniformity of the results and reducing the necessity of care and skill on the part of the operator.

Another feature of this invention applicable to machines and drums of all sizes and all types of fingers is that the positioning of the bars 41 in the desired pre-selected or adjusted position limits the load which the operator can apply to the drum by the application of poultry to the fingers and thus limits the torque load which the operator can apply to the motor. This permits the use of a smaller and cheaper motor with a machine of any given size since it is unnecessary to provide extra torque ability to take care of excessive or unusual loads which an operator may apply to a machine. At the same time this feature of the invention greatly reduces barking or scuffing of the skin of the poultry through carelessness or accident.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A poultry plucking machine including a cover or wall member having spaced elongated members defining a plurality of parallel passages, a rotatable drum disposed on one side of said cover or wall member with its axis of rotation normal to said elongated members and having flexible members projecting from its periphery, said flexible members extending through said passages and projecting from the other side of said cover or wall member, each of said flexible members having projections thereon adapted to engage poultry to be plucked.

2. A poultry plucking machine including a cover or wall member having spaced elongated members defining a plurality of parallel passages, a rotatable drum disposed on one side of said cover or wall member with its axis of rotation normal to said elongated members and having flexible members projecting from its periphery, said flexible members extending through said passages and projecting from the other side of said cover or wall member, each of said flexible members having a flexible leading surface on the portion projecting from the other side of said cover or wall member adapted to engage and remove feathers from poultry.

3. A poultry plucking machine including a supporting frame, a drum rotatably mounted in said frame having flexible poultry plucking fingers projecting from its periphery, said fingers being arranged in a plurality of axially spaced zones along said drum, a plurality of spaced elongated members defining a plurality of parallel passages secured to said frame and extending substantially normal to the axis of said drum and chordally with respect to the curve defined by the outer ends of said fingers, said elongated members extending into the spaces between said zones and said fingers extending through said passages and projecting past said elongated members, the spacing of said elongated members being such as to prevent the poultry or any parts thereof from being wrapped around the drum.

CONRAD BERN MUELLER, JR.

REFERENCES CITED

The following references are of record in the file of this patent:

UNITED STATES PATENTS

| Number | Name | Date |
|---|---|---|
| 1,791,843 | Reiss | Feb. 10, 1931 |
| 2,029,064 | Edwards | Jan. 28, 1936 |
| 2,300,157 | Hunt | Oct. 27, 1942 |
| 2,412,108 | Toti et al. | Dec. 3, 1946 |
| 2,413,711 | Jerome | Jan. 7, 1947 |